US012580459B2

(12) United States Patent
Bantz et al.

(10) Patent No.: US 12,580,459 B2
(45) Date of Patent: Mar. 17, 2026

(54) ELECTRICALLY CONDUCTIVE NONWOVEN, GROUNDING RING, COMPRISING SUCH A NONWOVEN AND ARRANGEMENT THEREWITH

(71) Applicant: Carl Freudenberg KG, Weinheim (DE)

(72) Inventors: Marlene Bantz, Edesheim (DE); Jens Hofmann, Mannheim (DE); Soeren Neuberger, Hockenheim (DE); Stefan Morgenstern, Wald-Michelbach (DE); Francois Colineau, Schallstadt-Leutersberg (DE); Guenter Hintenlang, Abtsteinach (DE)

(73) Assignee: CARL FREUDENBERG KG, Weinheim (DE)

( * ) Notice: Subject to any disclaimer, the term of this patent is extended or adjusted under 35 U.S.C. 154(b) by 585 days.

(21) Appl. No.: 17/752,887

(22) Filed: May 25, 2022

(65) Prior Publication Data

US 2022/0385148 A1     Dec. 1, 2022

(30) Foreign Application Priority Data

May 28, 2021     (DE) ...................... 10 2021 113 903.1

(51) Int. Cl.
*H02K 11/40*          (2016.01)
*H01R 4/66*           (2006.01)

(52) U.S. Cl.
CPC .............. *H02K 11/40* (2016.01); *H01R 4/66* (2013.01)

(58) Field of Classification Search
CPC ............. H01B 1/20; H02K 11/40; H01R 4/66

USPC .............................................................. 174/6
See application file for complete search history.

(56) References Cited

U.S. PATENT DOCUMENTS

| | | | |
|---|---|---|---|
| 11,073,210 B2 | 7/2021 | Hintenlang et al. | |
| 2008/0070463 A1* | 3/2008 | Arora .................. | H01M 50/494 |
| | | | 442/334 |
| 2014/0203514 A1 | 7/2014 | Colineau | |
| 2016/0010750 A1 | 1/2016 | Colineau | |
| 2019/0276119 A1 | 9/2019 | Colineau | |
| 2020/0295634 A1 | 9/2020 | Lenz | |
| 2021/0035703 A1* | 2/2021 | Lussey .................. | H01C 10/103 |

FOREIGN PATENT DOCUMENTS

| | | |
|---|---|---|
| DE | 102013000982 A1 | 7/2014 |
| DE | 102014010269 A1 | 1/2016 |
| DE | 102018104753 A1 | 9/2019 |
| DE | 102018105376 A1 | 9/2019 |
| DE | 102018124256 A1 | 4/2020 |
| DE | 102019113039 A1 | 6/2020 |
| JP | H04222275 A | 8/1992 |
| JP | H07229046 A | 8/1995 |
| KR | 20210024798 A | 3/2021 |
| WO | WO 2017/148586 A1 | 9/2017 |

* cited by examiner

*Primary Examiner* — Tremesha W Burns

(74) *Attorney, Agent, or Firm* — LEYDIG, VOIT & MAYER, LTD.

(57) ABSTRACT

An electrically conductive nonwoven includes: a raw nonwoven having a first electrical conductivity; and electrically conductive particles having a second electrical conductivity. The second electrical conductivity is higher than the first electrical conductivity. In an embodiment, the particles have a proportion by weight of from 30% to 60%. In an embodiment, the particles have a size of from 3 μm to 8 μm.

14 Claims, No Drawings

ELECTRICALLY CONDUCTIVE NONWOVEN, GROUNDING RING, COMPRISING SUCH A NONWOVEN AND ARRANGEMENT THEREWITH

CROSS-REFERENCE TO PRIOR APPLICATION

Priority is claimed to German Patent Application No. DE 10 2021 113 903.1, filed on May 28, 2021, the entire disclosure of which is hereby incorporated by reference herein.

FIELD

The invention relates to an electrically conductive nonwoven, to a grounding ring comprising such a nonwoven and to an arrangement therewith.

BACKGROUND

Electrically conductive nonwovens are widely known and are used, for example, in grounding rings in the field of "e-mobility". Particularly for such an application, it is advantageous for the electrically conductive nonwoven to have a particularly low electrical resistance and therefore a particularly high electrical conductivity. Nonwovens, including for the application described above, have hitherto had an electrical resistance of from $50\Omega$ to $500\Omega$, which is too high for an electromagnetic tolerance, for example, in connection with an electric motor of a motor vehicle.

A grounding ring and arrangement which comprises such a grounding ring are known from DE 10 2018 105 376 A1.

The grounding ring is configured as a buffer seal for a sealing ring and consists of an electrically conductive material which, during its intended use, tightly touches the surface of a first machine element to be grounded. A second machine element, which like the first machine element consists of an electrically conductive material and which is arranged concentrically with the first machine element, is grounded to a defined ground potential, the first and the second machine elements being electrically conductively connected by the grounding ring.

DE 10 2013 000 982 A1 discloses a seal, which comprises a sealing ring having at least one dynamically loaded sealing lip and a buffer seal configured as a grounding ring. The buffer seal is arranged at an axial distance next to the sealing lip and consists of an electrically conductive material. The sealing lip and the buffer seal tightly enclose a surface to be sealed of a first machine element to be sealed, the first machine element being arranged at a radial distance next to a second machine element. The sealing ring and the buffer seal are arranged in the gap formed by the radial distance. The second machine element is grounded to a defined ground potential, the first and the second machine elements respectively being touched tightly by the buffer seal and thereby being electrically conductively connected to one another.

The buffer seal is configured as a potential equalizing ring and consists, for example, of an electrically conductive nonwoven impregnated with PTFE. Mechanical damage of the machine elements by an electrical voltage breakdown is consequently prevented. Without the electrical potential equalization, mechanical damage of the machine elements to be sealed from one another could occur due to differently large electrical potentials of the machine elements being equalized by an electrical voltage breakdown. Such a voltage breakdown is commensurately more likely when the machine elements with different electrical potentials are arranged more closely next to one another. A voltage breakdown may cause material erosion on the machine element with a relatively small charge and a modification of the material structure in the region in which the voltage breakdown takes place.

DE 10 2014 010 269 A1 discloses a further buffer seal. The buffer seal comprises a substantially annularly configured disk made of an electrically conductive and air-permeable material, and a support body, the disk being configured as a separately produced individual part—in relation to the support body—and being connected to the support body.

The support body may be formed by a sealing ring.

The buffer seal has not only the task of electrical potential equalization, but furthermore the task of preventing contaminants from the surroundings from penetrating to the sealing lip of the sealing ring.

The buffer seal is a decoupled electrical bridge. In this context, "decoupling" is intended to mean that the sealing function of a sealing ring, which is for example combined with the buffer seal, is decoupled from the function of the electrical bridge, namely to prevent voltage breakdown and to achieve electrical potential equalization between the machine elements.

WO 2017/148586 A1 discloses a shaft grounding ring which is used to dissipate induced voltages or electrical charges from a first machine element, preferably a shaft, into a second machine element. The shaft grounding ring has an annular housing consisting of electrically conductive material, which is electrically conductively connected to a machine element and is in electrically conductive connection with at least one dissipating element. Due to production, the dissipating element is disk-shaped, likewise consists of an electrically conductive material and is in electrically conductive connection with the other machine element. The dissipating element may consist of a PTFE material having electrically conductive fillers. Silver lacquer is disclosed as the electrically conductive material, which encloses the dissipating element, preferably fully, in particular when it consists of an electrically nonconductive material. Silver lacquer is therefore simply applied onto the base body of the dissipating element and has a very low specific resistivity. The dissipating element is a disk-shaped dissipating body extending at least over a part of its circumference. The resiliently bent edge region of the dissipating body may, as seen in the circumferential direction, be provided with slots that are open toward the edge. These slots are applied with a number and/or length such that the restoring force with which the edge region bears on the first or second machine element is on the one hand sufficiently high for enough conductive area of the electrically conductive material to bear on the corresponding machine element, but on the other hand so low that the friction is minimized.

SUMMARY

In an embodiment, the present invention provides an electrically conductive nonwoven, comprising: a raw nonwoven having a first electrical conductivity; and electrically conductive particles having a second electrical conductivity, wherein the second electrical conductivity is higher than the first electrical conductivity.

DETAILED DESCRIPTION

In an embodiment, the present invention provides an electrically conductive nonwoven, and a grounding ring provided therewith, in such a way that it has a particularly low electrical resistance and therefore a particularly high electrical conductivity, so that such a grounding ring may also be used advantageously in connection with e-mobility.

In an embodiment, the present invention provides an electrically conductive nonwoven comprising a raw nonwoven having a first electrical conductivity is provided, wherein the raw nonwoven comprises electrically conductive particles having a second electrical conductivity and wherein the second electrical conductivity is higher than the first electrical conductivity.

Owing to the fact that the electrically conductive particles have an improved electrical conductivity in comparison with the raw nonwoven, the electrical conductivity of the nonwoven as a whole is improved.

The electrical resistance may because of the electrically conductive particles be $\leq 10\Omega$ during operation, and in the new state even $\leq 1\Omega$, and therefore substantially lower than for conventional nonwovens without electrically conductive particles.

The particles preferably have a proportion by weight of from 30% to 60%. In this case, it is advantageous that there are sufficiently many particles in the nonwoven for a good electrical conductivity and that the particles are distributed uniformly in the nonwoven. It is furthermore advantageous that such a proportion by weight is economically less expensive to achieve than a higher proportion by weight. Proportions by weight of less than 30% lead to an insufficient increase in the electrical conductivity of the nonwoven.

With a proportion by weight of more than 60%, the stiffness of the nonwoven refined with electrically conductive particles increases and the flexibility decreases. The radial force and the pressure therefore increase, which can lead to increased abrasion. Furthermore, with a higher proportion of electrically conductive particles, the crosslinking and therefore the chemical stability of the elastomer in the nonwoven is degraded.

The particles preferably have a size of from 3 µm to 8 µm. Such a particle size may be introduced into the raw nonwoven particularly reliably in terms of processing. If the electrically conductive particles are applied onto the raw nonwoven by impregnating, for example, particles of this size do not undesirably sediment in an impregnating bath.

These advantages can no longer, or only limitedly, be achieved by particles outside the aforementioned range.

Particles with a size of much more than 8 µm would lead to failure of the radial shaft sealing ring when using the electrically conductive nonwoven as a grounding ring and buffer seal in connection with a radial shaft sealing ring, because the particles could emerge from the nonwoven to underneath the sealing edge of the sealing ring. The airtightness of the nonwoven could also thereby become so low that the sealing ring in technical functional cooperation therewith, for example the pump action thereof, no longer functions reliably.

According to one advantageous configuration, it may be provided that the particles are formed by silver particles. Silver particles have a particularly high electrical conductivity and are therefore very suitable for significantly increasing the electrical conductivity of the raw nonwoven. This significant increase in the electrical conductivity may be achieved by the particularly high conductivity of the silver particles even if the proportion by weight of the particles is only relatively low, for example in the aforementioned range of between 30% and 60%.

The raw nonwoven may comprise fibers having a fiber thickness of from 4 µm to 10 µm. Such a fiber thickness is advantageous because an anisotropic structure is thereby formed and fiber ends of the nonwoven always touch the two machine elements to be electrically conductively connected to one another, that is to say for example the shaft and the housing enclosing the shaft.

The size of the particles advantageously corresponds substantially to the fiber thickness of the fibers of the nonwoven.

The effect achieved by such a configuration of the fiber thickness is that the nonwoven does not become undesirably stiff, that the fibers do not break over a long service life during intended use of the nonwoven, and the required air permeability is ensured.

According to one advantageous configuration, it may be provided that the raw nonwoven comprises fibers having a fiber length of from 10 mm to 14 mm. In this case, it is advantageous that the desired stiffness/flexibility of the nonwoven is achieved for most applications by fibers with such a fiber length.

The raw nonwoven may additionally comprise PTFE particles. Especially when the electrically conductive nonwoven is dynamically loaded, and for example when it is employed as a grounding ring in connection with a seal, for example a sealing ring, the friction is reduced by such a measure and the wear is therefore reduced.

The PTFE particles may have a proportion by weight of from 5% to 15%. For most applications, such a proportion by weight is sufficient to reduce friction during intended use to a minimum. It is furthermore advantageous that such a nonwoven may be produced relatively inexpensively in economic terms because of the low proportion by weight of PTFE particles.

The nonwoven may have a thickness which is from 0.4 mm to 0.8 mm. A nonwoven having such a thickness has on the one hand a high electrical conductivity and on the other hand good resilient yielding in order to tightly enclose/touch a machine element with which it is in contact.

The surface weight of the nonwoven may be from 500 g/m² to 1000 g/m². In this case, it is advantageous that the machine element produced from the nonwoven, for example a grounding ring, has only a very low overall weight. When combined with a sealing ring to form a technical functional unit, the weight of the grounding ring is almost negligibly low. Furthermore, with such a surface weight it is advantageous that, after the end of impregnating, the nonwoven is sufficiently permeated with impregnation and the resilient properties of the nonwoven are ensured in combination with its electrical conductivity.

With lower or higher surface weights, it is disadvantageous that in particular the electrical conductivity is insufficient and/or the mechanical properties of the nonwoven are unsuitable for many applications.

The linear pressure in a radial force measurement according to DIN 3761, measurement on the shaft, in the production-related state of the nonwoven may be from 0.1 N/mm to 0.8 N/mm.

The aforementioned range is particularly advantageous because a higher linear pressure would increase the friction and concomitantly the generation of heat, and the lifetime would thereby be reduced due to undesirably premature ageing of the nonwoven.

A lower linear pressure would lead to the nonwoven no longer functioning as an electrically conductive machine element; as a grounding ring, the nonwoven would no longer reliably touch the radially adjacent machine elements during dynamic loading.

The production of an electrically conductive nonwoven as described above may be carried out by impregnating a raw nonwoven with an impregnation that comprises the electrically conductive particles.

The impregnation may be applied onto the raw nonwoven on both sides or only one side.

An impregnation applied onto the raw nonwoven only on one side has the advantage that less impregnation is used in this case and the nonwoven can therefore be produced more inexpensively.

A further advantage is that an orientation is imparted to a nonwoven disk impregnated only on one side. If the nonwoven disk is used for example in combination with a radial shaft seal and is adhesively bonded thereon, depending on the mounting direction, the impregnated side of the nonwoven disk must face away from or toward the radial shaft seal when the latter is being adhesively bonded. When threading the shaft through or pressing onto the shaft, the other edge region of the nonwoven disk bends toward one side or the other, depending on the mounting direction, it being necessary to ensure that the impregnated side is in contact both with the shaft and with the housing in the mounted state, in order to establish the electrically conductive connection. Such directional adhesive bonding is also advantageous for the process control.

The invention furthermore relates to a grounding ring comprising a nonwoven ring consisting of an electrically conductive nonwoven as described above. Such a grounding ring may be employed in the field of e-mobility.

The nonwoven ring may be fastened on an electrically conductive support ring. The fastening may be carried out adhesively or mechanically, for example by clamping.

An arrangement comprising such a grounding ring as well as a first machine element and a second machine element is furthermore claimed, wherein the grounding ring tightly touches a surface to be sealed of the first machine element, wherein the first machine element is arranged concentrically with the second machine element, wherein the first machine element is arranged at a radial distance next to the second machine element, wherein the grounding ring is arranged in the gap formed by the radial distance, wherein the second machine element is grounded to a defined ground potential and wherein the first and the second machine elements are respectively touched tightly by the grounding ring and are thereby electrically conductively connected to one another. The first machine element may be formed by a shaft or by a housing enclosing the shaft, and the second machine element may be formed by a housing enclosing a shaft or by a shaft.

While the invention has been described in detail in the foregoing description, such descriptions are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electrically conductive nonwoven, comprising:
a raw nonwoven having a first electrical conductivity; and
electrically conductive particles having a second electrical conductivity,
wherein the second electrical conductivity is higher than the first electrical conductivity, and
wherein the particles have a size of from 3 μm to 8 μm, and
wherein the nonwoven has an electrical resistance of less than or equal to 10 ohms (Ω).

2. The nonwoven of claim 1, wherein the particles have a proportion by weight of from 30% to 60%.

3. The nonwoven of claim 1, wherein the particles comprise silver particles.

4. The nonwoven of claim 1, wherein the raw nonwoven comprises fibers having a fiber thickness of from 4 μm to 10 μm.

5. The nonwoven of claim 4, wherein the raw nonwoven comprises fibers having a fiber length of from 10 mm to 14 mm.

6. The nonwoven of claim 4, wherein the raw nonwoven comprises PTFE particles.

7. The nonwoven of claim 6, wherein the PTFE particles have a proportion by weight of from 5% to 15%.

8. The nonwoven of claim 1, wherein the nonwoven has a thickness is from 0.4 mm to 0.8 mm.

9. The nonwoven of claim 1, wherein the nonwoven has surface weight of from 500 g/m² to 1000 g/m².

10. The nonwoven of claim 1, wherein the nonwoven has a linear pressure in a radial force measurement according to DIN 3761, measurement on a shaft, in a production-related state of the nonwoven of from 0.1 N/mm to 0.8 N/mm.

11. A grounding ring, comprising:
a nonwoven ring comprising the electrically conductive nonwoven of claim 1.

12. The grounding ring of claim 11, wherein the nonwoven ring is fastened on an electrically conductive support ring.

13. An arrangement, comprising:
the grounding ring of claim 11;
a first machine element; and
a second machine element,
wherein the grounding ring tightly touches a surface of the first machine element,
wherein the first machine element is arranged concentrically with the second machine element,
wherein the first machine element is arranged at a radial distance next to the second machine element,
wherein the grounding ring is arranged in a gap formed by the radial distance,
wherein the second machine element is grounded to a defined ground potential, and wherein the first machine element and the second machine element are respectively touched tightly by the grounding ring and are thereby electrically conductively connected to one another.

14. The arrangement of claim 13, wherein the first machine element comprises a shaft or a housing enclosing a shaft, and wherein the second machine element comprises a housing enclosing the shaft or a shaft.

\* \* \* \* \*